United States Patent
Byrne et al.

(10) Patent No.: US 6,408,306 B1
(45) Date of Patent: Jun. 18, 2002

(54) METHOD AND SYSTEM FOR AUTOMATED DISTINGUISHED NAME LOOKUP

(75) Inventors: Debora J. Byrne, Austin; Reggie Hill, Round Rock; Shepherd S. B. Shi, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,841

(22) Filed: Dec. 14, 1999

(51) Int. Cl.[7] .............................................. G06F 17/30
(52) U.S. Cl. .............................. 707/104; 707/3; 707/4; 707/5; 707/102
(58) Field of Search .......................... 707/3, 4, 5, 104, 707/102

(56) References Cited

U.S. PATENT DOCUMENTS

| | | | | |
|---|---|---|---|---|
| 6,016,499 A | * | 1/2000 | Ferguson | 707/104 |
| 6,085,188 A | * | 7/2000 | Bachmann et al. | 707/3 |
| 6,161,139 A | * | 12/2000 | Win et al. | 709/225 |
| 6,182,142 B1 | * | 1/2001 | Win et al. | 709/229 |
| 6,185,288 B1 | * | 2/2001 | Wong | 379/219 |
| 6,199,062 B1 | * | 3/2001 | Byrne et al. | 707/3 |
| 6,208,986 B1 | * | 3/2001 | Schneck et al. | 707/3 |
| 6,243,676 B1 | * | 6/2001 | Witteman | 704/243 |
| 6,292,838 B1 | * | 9/2001 | Nelson | 709/236 |

OTHER PUBLICATIONS

The String Representation of LDAP Search Filters; Howes, T.; Dec. 1997; pp. 1–7.
A String Representation of Distinguished Names; Kille, S.; Mar. 1995, pp. 1–7.

* cited by examiner

*Primary Examiner*—Frantz Coby
(74) *Attorney, Agent, or Firm*—Duke W. Yee; Volel Emile

(57) ABSTRACT

A method and system for an automated distinguished name lookup is provided for use in a Lightweight Directory Access Protocol (LDAP) directory operation. A user provides input via a dialog window for an identifier string which is not a distinguished name. An LDAP search filter string is generated that contains at least a portion of the identifier string. A directory search is requested using the LDAP search filter string. In response to the requested directory search, one or more distinguished names are received. In response to receiving a single distinguished name for the requested directory search, the received distinguished name is automatically applied in the LDAP directory operation. In response to receiving a plurality of distinguished names for the requested directory search, the plurality of distinguished names are presented to the user, and the user may select one of the plurality of distinguished names. The selected distinguished name is then applied in the LDAP directory operation, which may perform an authentication process for the user using a distinguished name received in response to the requested directory search. The user may also configure a dialog window for entry attributes and filters to be used while searching for potential distinguished names.

44 Claims, 6 Drawing Sheets

FIG. 7
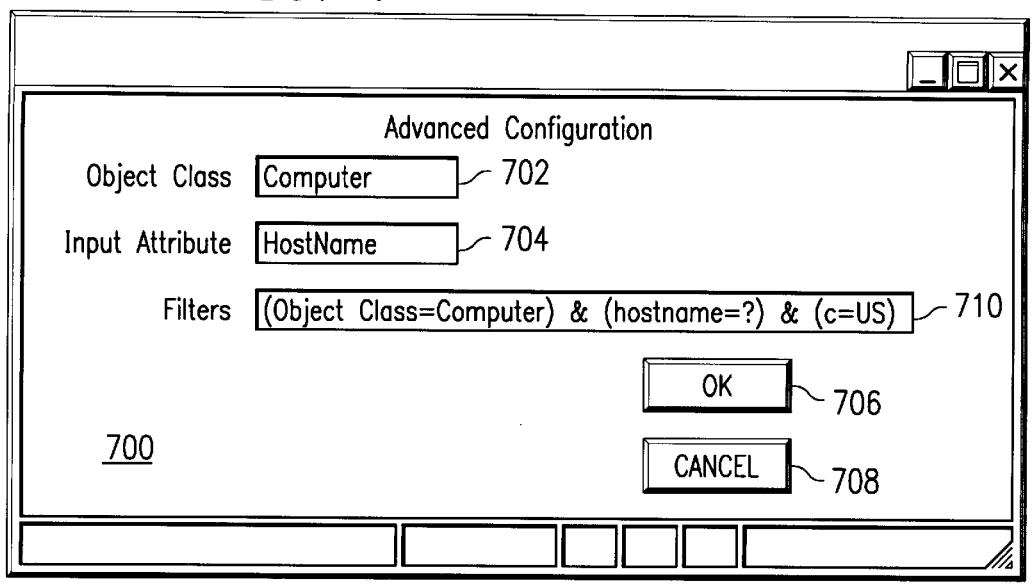
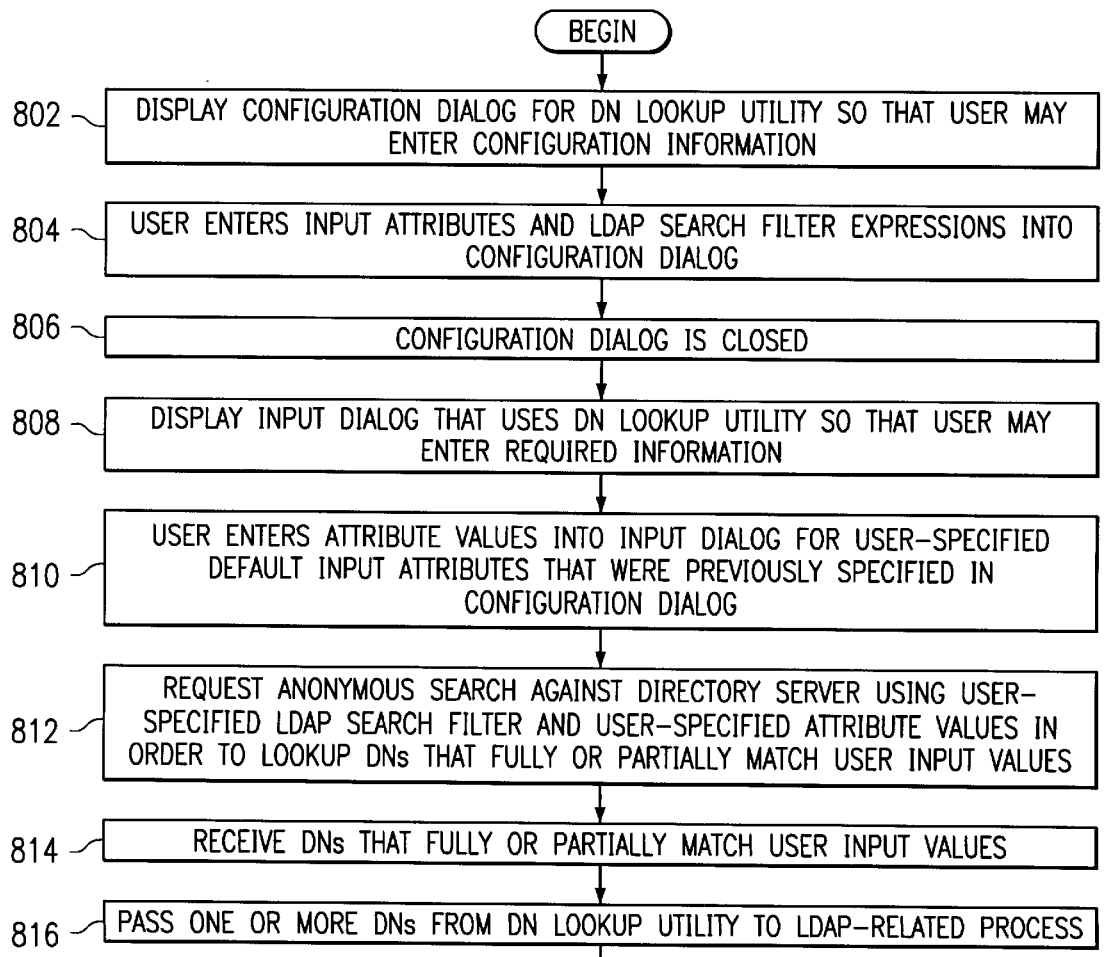
FIG. 8

METHOD AND SYSTEM FOR AUTOMATED DISTINGUISHED NAME LOOKUP

BACKGROUND OF THE INVENTION

1. Technical Field

The present invention relates generally to an improved data processing system and, in particular, to a method and apparatus for database or file accessing.

2. Description of Related Art

A directory service is a central point where network services, security services and applications can form an integrated distributed computing environment. Typical uses of a directory service may be classified into several categories. A "naming service", such as Directory Naming Service (DNS) or Cell Directory Service (CDS), uses the directory as a source to locate an Internet Host address or the location of a given server. A "user registry", such as Novell Directory Services (NDS), stores information about users in a system comprised of a number of interconnected machines. Still another directory service is a "white pages" lookup provided by some mail clients, such as Netscape Communicator or Lotus Notes.

Lightweight Directory Access Protocol (LDAP) is a software protocol for providing directory service enablement to a large number of applications. These applications range from e-mail to distributed system management tools. LDAP is an evolving protocol model based on the client-server model in which a client makes a TCP/IP connection to an LDAP server. LDAP is a "lightweight" version of DAP (Directory Access Protocol), which is part of X.500, a standard for directory services in a network. More information about LDAP may found in "Lightweight Directory Access Protocol (v3)", http://ietf.org/rfc/rfc2251.txt.

The LDAP information model is based on an "entry", which contains information about some object. Entries are typically organized in a specified tree structure, and each entry is composed of attributes. LDAP entries are usually arranged in a tree structure that follows a geographical and organizational distribution. Each entry is named according to their position in the hierarchy by a distinguished name (DN). Each component of the distinguished name is called a Relative Distinguished Name (RDN).

An example LDAP directory is organized in a simple tree hierarchy consisting of the following levels:

The "root" directory is the starting place or the source of the tree.

Countries are designated by two letter codes, such as US for the United States of America.

Organizations can be private companies, government units, etc.

Organizational units are divisions, departments, etc.

Individuals include people, files, or shared resources, such as printers.

For example, John M. Smith, who is part of the marketing department at Acme Corporation, might have the following Distinguished Name: "cn=John M. Smith, ou=Marketing, o=ACME Corporation, c=US", where "cn" stands for "common name", "ou" is "organizational unit", "o" is "organization", and "c" is "country".

An LDAP directory can be distributed among many servers, with parts of data residing on a set of machines. Another scenario has each server containing a replicated version of the total directory that is synchronized periodically. An LDAP server is called a Directory System Agent (DSA). An LDAP server that receives a request from a user takes responsibility for the request, passing it to other DSAs as necessary, either through server chaining or client referrals. Both cases ensure a single coordinated response for the user. Although directory structures can reside on a single server, there are several reasons for splitting directories across multiple machines. First, the directory may be too large to make it practical to store on a single server. Second, network administrators may want to keep the physical location of the server close to the expected clients to minimize network traffic.

With an increasing number of applications and system services demanding a central information repository, directory servers can provide system administrators with a data repository that can significantly ease administrative burdens. In the Internet/intranet environment, these services provide user access to information in a secure manner.

To perform operations on directory entries, distinguished names for the directory entries must be specified. However, it is generally difficult to remember full distinguished names. Manually specifying a full distinguished name is time-consuming and error-prone.

For example, in order to connect, i.e. bind, to a directory server, a user needs to specify a distinguished name in order for the bind operation to proceed. Other LDAP operations also require the entry of distinguished names, such as modifying a particular directory entry. In some circumstances, the user may not know the distinguished name of a directory entry on which the user desires to perform an operation, although the user might be able to discern a desired distinguished name from a set of distinguished names if the user could be presented with the ability to choose a particular distinguished name from a set of distinguished names.

Therefore, it would be advantageous to have an improved method and system for specifying distinguished names.

SUMMARY OF THE INVENTION

A method and system for an automated distinguished name lookup is provided for use in a Lightweight Directory Access Protocol (LDAP) directory operation. A user provides input via a dialog window for an identifier string which is not a distinguished name. An LDAP search filter string is generated that contains at least a portion of the identifier string. A directory search is requested using the LDAP search filter string. In response to the requested directory search, one or more distinguished names are received. In response to receiving a single distinguished name for the requested directory search, the received distinguished name is automatically applied in the LDAP directory operation. In response to receiving a plurality of distinguished names for the requested directory search, the plurality of distinguished names are presented to the user, and the user may select one of the plurality of distinguished names. The selected distinguished name is then applied in the LDAP directory operation, which may perform an authentication process for the user using a distinguished name received in response to the requested directory search. The user may also configure a dialog window for entry attributes and filters to be used while searching for potential distinguished names.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram showing a dialog for user input of additional attributes and filters; and FIG. 8 is a flowchart depicting a process for allowing a user to configure a DN lookup utility to facilitate anonymous searches for DNs.

DETAILED DESCRIPTION OF THE PREFERRED EMBODIMENT

Figure 1:
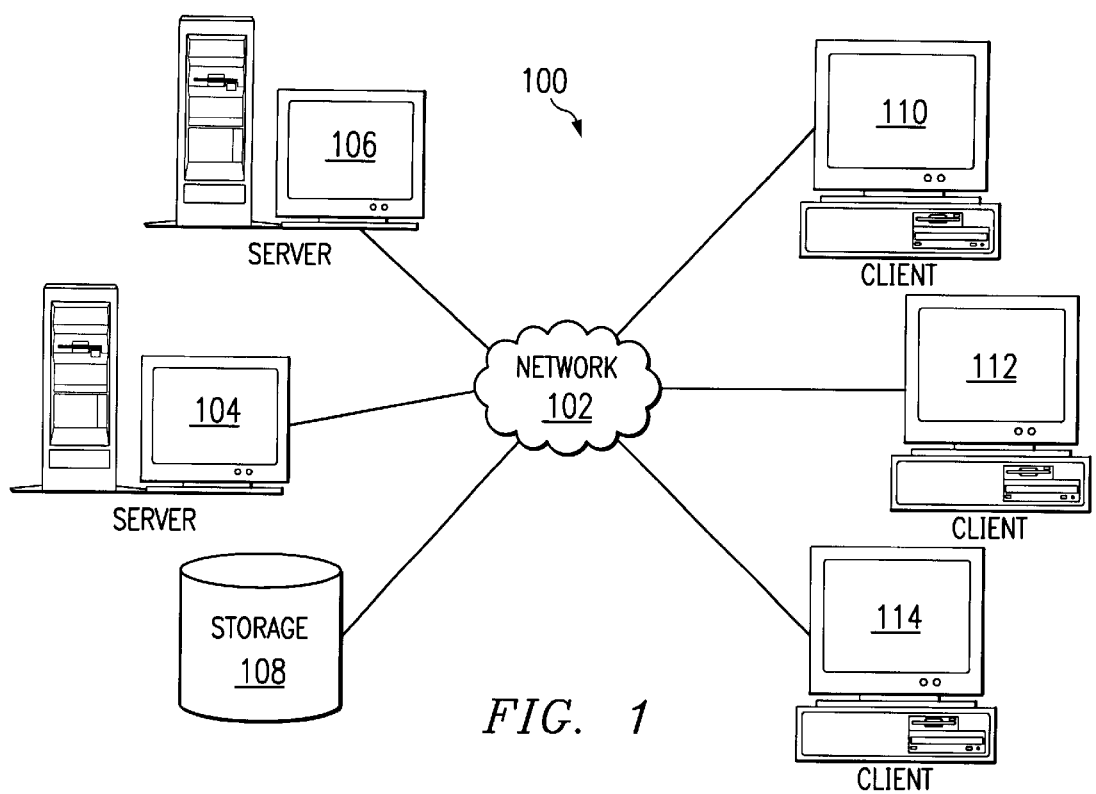
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 and server 106 is connected to network 102 along with storage unit 108. In addition, clients 110, 112, and 114 also are connected to network 102. These clients 110, 112, and 114 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 110–114.

Clients 110, 112, and 114 are clients to server 104. Additionally, clients 110–114 also may be clients to server 106 in these examples. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
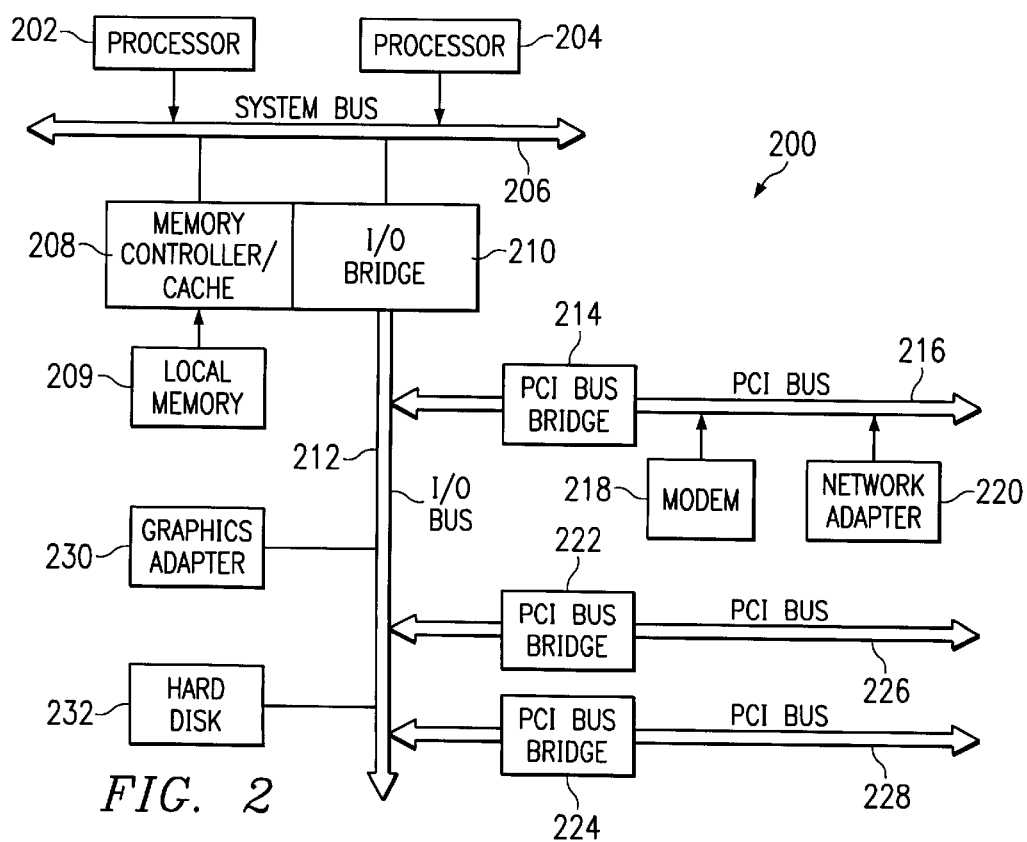
FIG. 2 is a block diagram depicting a data processing system that may be implemented as a server.

With reference now to FIG. 2, a block diagram depicting a data processing system that may be implemented as a server, such as server 104 or server 106 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Referring again to FIG. 1, servers 104 and 106 may be LDAP servers, which provide location services to various resources in distributed data processing system 100. The location information is contained in a LDAP directory, which may be located at server 104 or server 106. Further, the directory may be distributed between these and other servers not shown.

Servers 104 and 106 are able to perform the appropriate operations on the LDAP directory and return responses to clients making requests for information. The LDAP directory is also referred to as a directory information tree (DIT). This tree is made up of entries in which each entry has names. One or more attribute values from the entry form its relative distinguished name (RDN), which is unique among siblings in the tree. The concatenation of the relative distinguished names of the sequence of the entries from a particular entry to an immediate subordinate of the root of the tree forms that entry's distinguished name (DN), which is unique within the tree. An example of a distinguished name is CN=Steve Smith, O=Seek Limited, C=GB. More information for the format for specifying DNs may found in "A String Representation of Distinguished Names", http://ietf.org/rfc/rfc1779.txt.

An LDAP process on a server contains the functionality necessary to receive requests from clients, process the request, and return responses to clients originating the request. In particular, LDAP provides a number of known functions including query (search and compare), update, authentication, and others. The search and compare operations are used to retrieve information from the server. For the search operation, the criteria of the search is specified in a search filter.

A filter is used by an LDAP process to define the conditions that must be fulfilled in order for the search to match a given entry. When a request is received by a server from a client, a search operation is performed based on the search request received from the client. The search request includes a selection of a filter used to determine which entries will be responsive to the request. More information for the format of search filters may found in "A String Representation of LDAP Search Filters", http://ietf.org/rfc/rfc2254.txt.

Typically, the search filter is a Boolean expression consisting of attribute names, attribute values, and Boolean operations, such as AND/OR and NOT. Filters may be used to perform complex search operations. Further, the users will specify a base distinguished name (DN). This base DN is the starting point of the search and the search scope. The search scope itself specifies whether the search request may be applied to a single entry, an entry's children, or an entire subtree. A single entry is considered a base level search, while applying a request to an entry's children is a one level search. Applying a request to entire subtree is called a subtree search.

As noted previously, it is generally difficult to remember full distinguished names. In addition, manually specifying a full distinguished name is time-consuming and error-prone. In some circumstances, the user may not know the distinguished name of a directory entry on which the user desires to perform an operation, although the user might be able to discern a desired distinguished name from a set of distinguished names if the user could be presented with the ability to choose a particular distinguished name from a set of distinguished names.

The present invention is directed to a method, apparatus, and computer-implemented instructions for providing user-friendly options to input distinguished names in which the options may be contained within an automated DN lookup utility or tool. Instead of requiring users to enter a DN whenever necessary, the DN lookup utility locates the DN using the input information provided by a user. The DN lookup utility may operate as a stand-alone utility, or it may operate within various other applications, processes, routines, etc.

For example, in order to connect, i.e. bind, to a directory server or perform an operation against a directory entry, a user needs to be authenticated to the directory server, preferably through a directory logon procedure. To authenticate to the directory server, the user needs to provide a user identifier, i.e. distinguished name, and a password.

In accordance with a preferred embodiment of the present invention, the user is not required to input a DN but may input some other type of identifying information. Rather than typing in a full DN, a user may input a given identifier or just a few characters of a given identifier, and the DN lookup utility automatically determines the full, appropriate DN. The automated DN lookup may be applied in any computing situation in which a user is required to specify a DN. Users may also configure attributes and filters to search for DN candidates.

Figure 3:
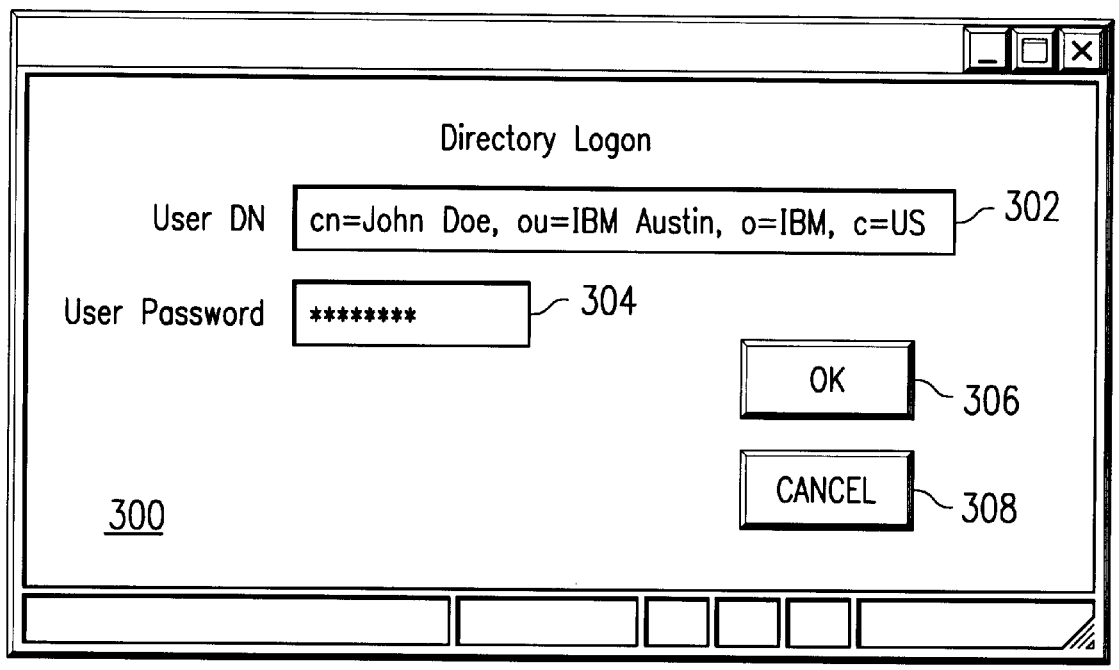
FIG. 3 is a diagram showing a typical directory logon dialog.

With reference now to FIG. 3, a diagram shows a typical directory logon dialog. Window 300 is a dialog that allows a user to specify user DN 302 and user password 304 in addition to standard dialog buttons 306–308 for "OK" and "CANCEL". In order to connect to a directory server for performing directory operations, users need to authenticate to the directory server. The LDAP API ldap_simple_bind may be used to authenticate the user to the directory server using a DN and a password. The ldap_simple_bind operation is used to identify the person or application that is accessing information over LDAP.

A distinguished name is a character string that is usually difficult to memorize. In other cases, the user may never have known the distinguished name of the object in the directory which the user desires to access and/or modify. Additionally, even if the user can remember the proper DN, it may be difficult to input the entire DN without an error.

Figure 4A:
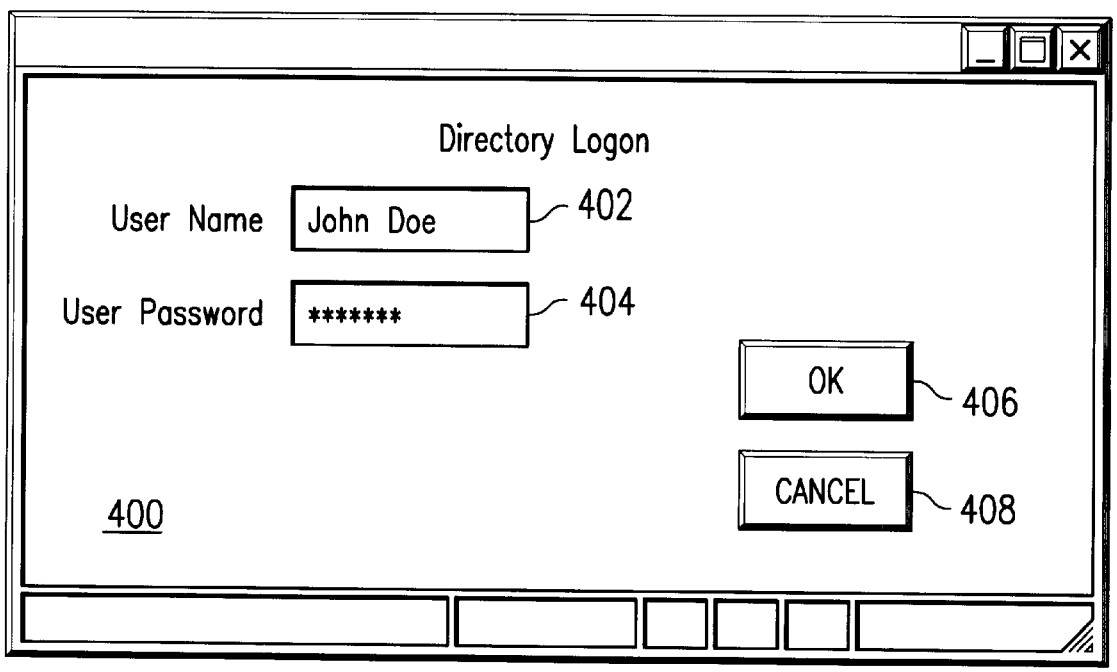
FIG. 4A is a diagram showing an LDAP directory logon dialog with a full user name.

With reference now to FIG. 4A, a diagram shows an LDAP directory logon dialog with a full user name in accordance with a preferred embodiment of the present invention. Window 400 is a dialog that allows a user to specify user name 402 and user password 404 in addition to standard dialog buttons 406–408 for "OK" and "CANCEL". Instead of requiring a user to enter a DN, the automated DN lookup utility of the present invention asks the user to input a user name, which may be the user's given name. In this case, the user has entered "John Doe". With the name provided by the user, an anonymous search is performed against the directory server, and all of the DNs which match against the user name are located. Assuming that a DN is found for the user name, the automated DN lookup utility provides the DN to the remainder of the logon process to connect to the directory server with the returned DN and the password provided by the user.

In the example, a single directory server is implied for the directory lookup and authentication. Alternatively, a DNS lookup could be performed in order to get the names of the servers on which the search should be made for the DN lookup. The user could then be prompted to select a server from a list of servers.

Figure 4B:
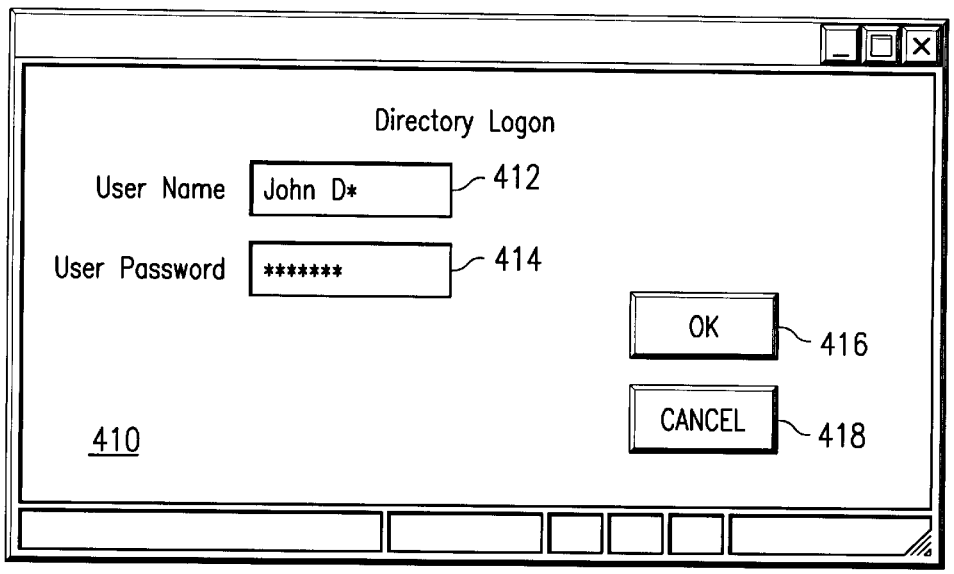
FIG. 4B is a diagram showing an LDAP directory logon dialog with a partial user name.

With reference now to FIG. 4B, a diagram shows an LDAP directory logon dialog with a partial user name in accordance with a preferred embodiment of the present invention. Similar to FIG. 4A, window 410 is a dialog that allows a user to specify user name 412 and user password 414 in addition to standard dialog buttons 416–418 for "OK" and "CANCEL". The automated DN lookup utility of the present invention allows the user to input wild card characters ( "*"; "?") in conjunction with a given name. In this case, instead of entering a full given name, such as "John Doe", the user has entered "John D*". Using a portion of or all of the name string provided by the user, an LDAP search filter string is created and sent to a directory server, where an anonymous search is performed against the directory. It should be noted that the wildcard indicator supplied by the user may be replaced or modified as needed to generate a proper LDAP search filter string. All of the DNs which match against the user name string are located and returned to the LDAP client. If a single DN is found for the user name, the automated DN lookup utility provides the DN to the remainder of the logon process to connect to the directory server with the returned DN and the password provided by the user.

Figure 4C:
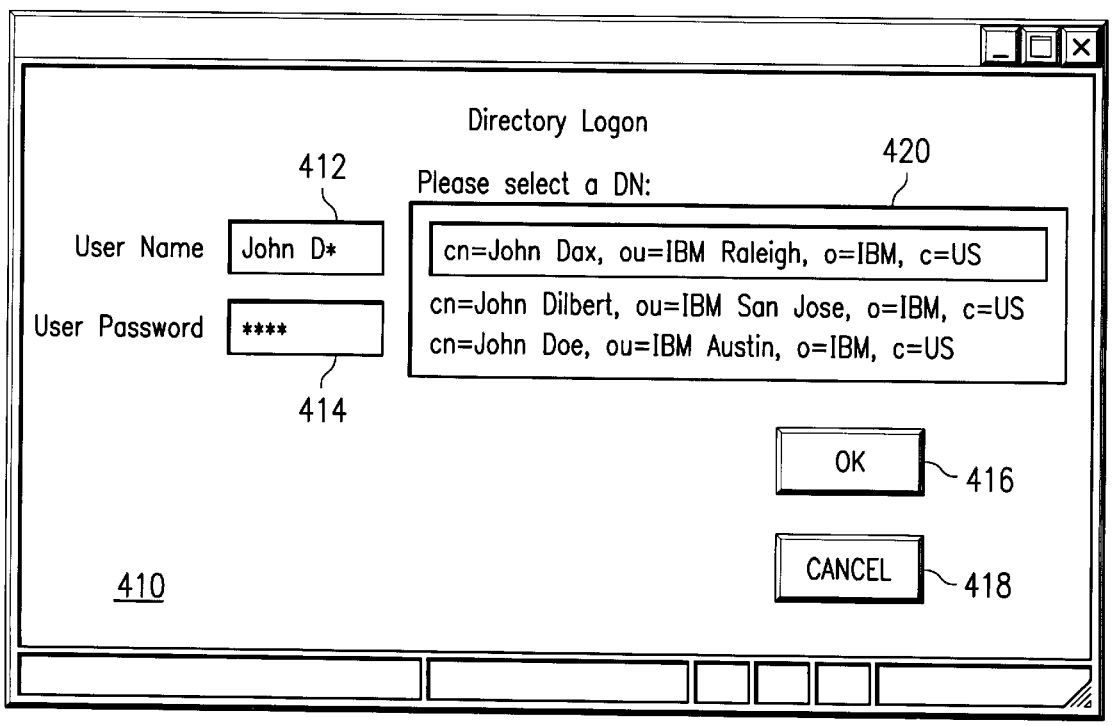
FIG. 4C is a diagram showing an LDAP directory logon dialog with a resulting list of DNs for a partial user name.

With reference now to FIG. 4C, a diagram shows an LDAP directory logon dialog with a resulting list of DNs for a partial user name in accordance with a preferred embodiment of the present invention. Similar to FIG. 4B, window 410 is a dialog that allows a user to specify user name 412 and user password 414 in addition to standard dialog buttons 416–418 for "OK" and "CANCEL". The user has entered a wild card character ("*") in conjunction with a given name, and an anonymous search containing the partial user name has been performed against the directory server. All of the DNs which match against the user name string have been located and displayed in DN list 420. Once the user selects a DN, the automated DN lookup utility provides the selected DN to the remainder of the logon process to connect to the directory server with the selected DN and the password provided by the user.

Figure 4D:
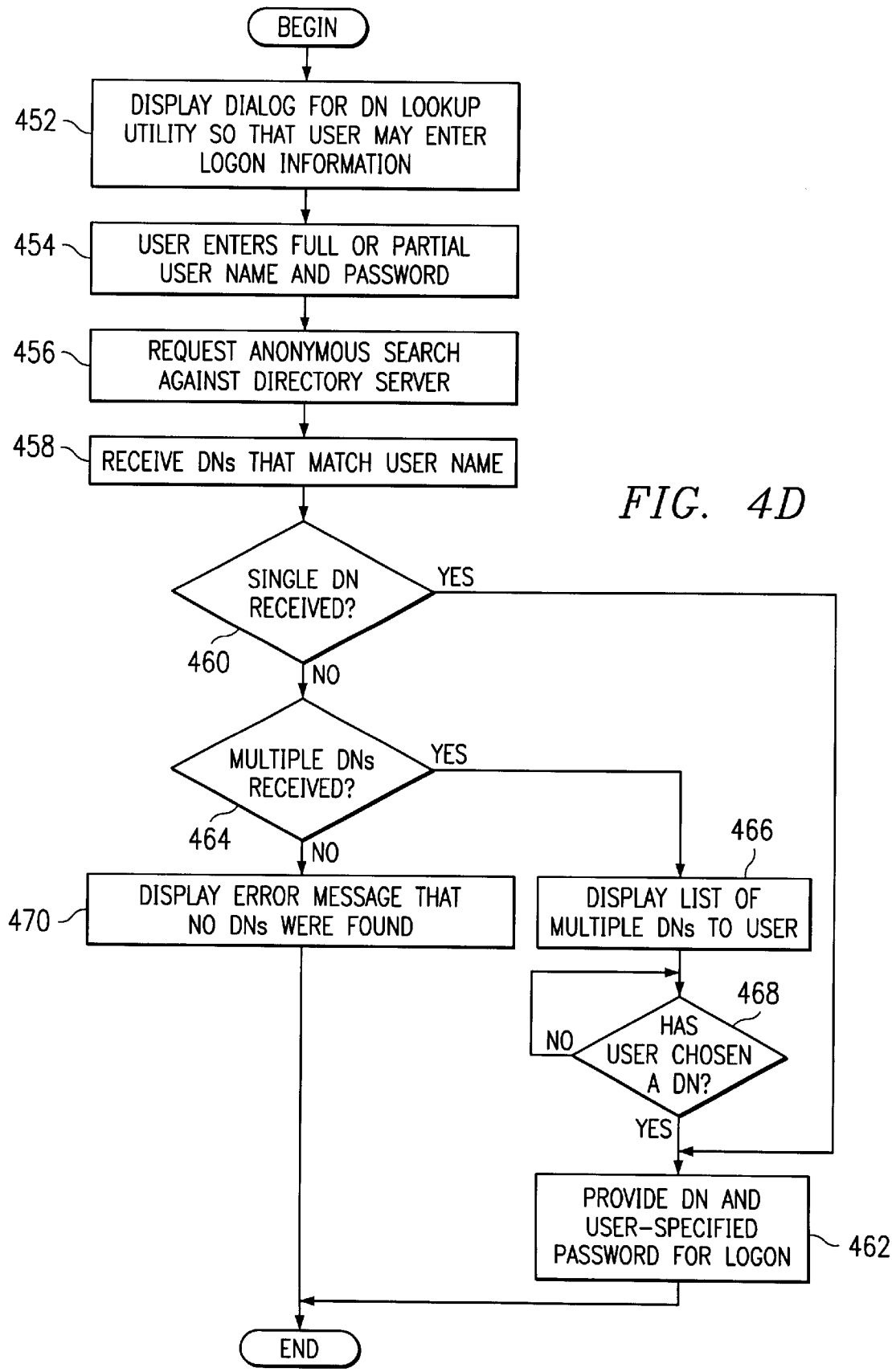
FIG. 4D is a flowchart depicting a process for operating an LDAP directory logon dialog.

With reference now to FIG. 4D, a flowchart depicts a process for operating an LDAP directory logon dialog in accordance with a preferred embodiment of the present invention. The process begins when a dialog window is displayed by an automated DN lookup utility so that a user may enter logon-related information (step 452). A user enters either a full user name or a partial user name and a password (step 454). An anonymous search is then requested against one or more directory servers in a manner appropriate for the directory structure implemented within the system (step 456). The automated DN lookup utility then receives one or more DNs that fully or partially match the user name information specified by the user (step 458).

A determination is then made as to whether a single DN has been received from the directory search (step 460). If so, then the process branches so that the DN lookup utility provides the received DN and the user-specified password to the remainder of the logon process, which would complete the logon process for the user (step 462), and the process is then complete. In this manner, the user has merely entered his or her given name rather than a distinguished name. Since a given name would be known to the user, the user is not required to remember a full distinguished name, thereby requiring less effort to complete the logon process.

If a single DN is not returned to the DN lookup utility, then a determination is made as to whether multiple DNs have been found that fully or partially match the user name information specified by the user (step 464). If so, then these multiple DNs are displayed as a list of DNs for the user to choose a single DN (step 466). The process then enters a loop waiting for the user to select a single DN. A determination is made as to whether the user has selected a DN (step 468). If not, then the process branches to continue displaying the list of DNs to the user to allow the user to select a single DN. If the user has selected a DN, then the DN lookup utility provides the received DN and the user-specified password to the remainder of the logon process, which would complete the logon process for the user, as mentioned previously in step 462, and the process would then be complete.

If multiple DNs have not been found that fully or partially match the user name information specified by the user, as mentioned in step 464, then an error message may be displayed to the user that the user name information supplied by the user has not resulted in any fully or partially matching DNs (step 470), and the process is then complete.

Figure 5:
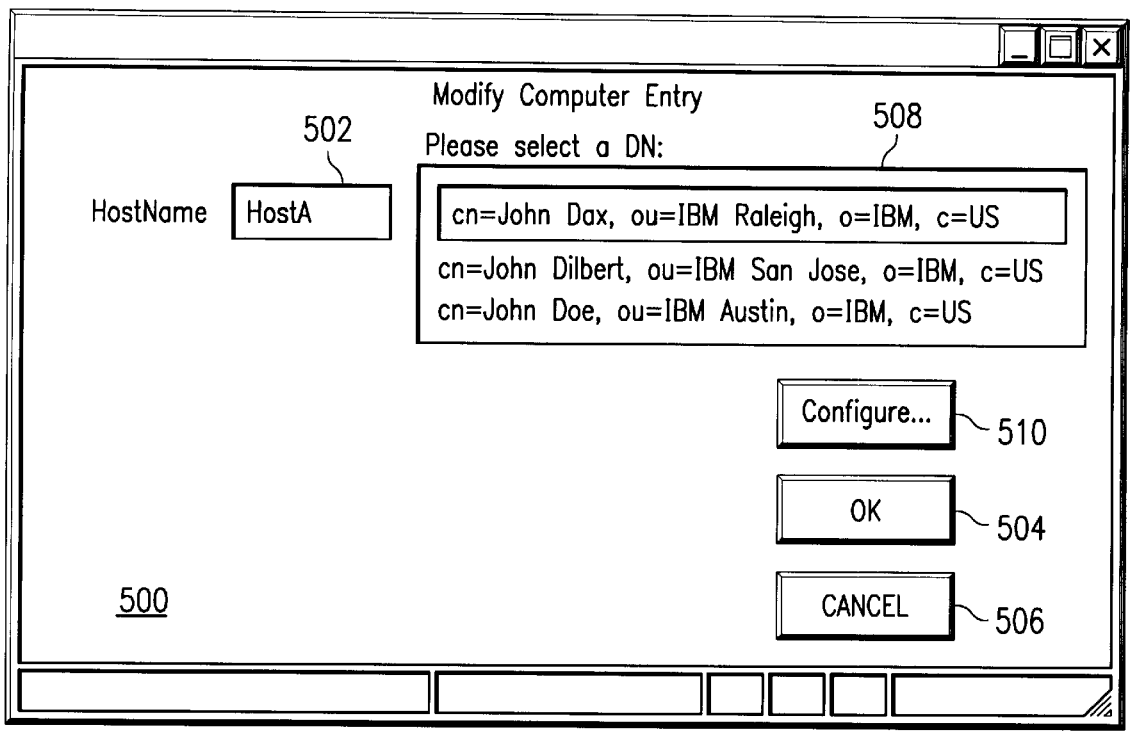
FIG. 5 is a diagram showing a dialog for a computer host name lookup with a resulting list of DNs that may be used with a further configuration process.

With reference now to FIG. 5, a diagram shows a dialog for a computer host name lookup with a resulting list of DNs that may be used with a further configuration process in accordance with a preferred embodiment of the present invention. To perform operations against a directory entry, users usually need to specify the DN of the entry. To help a user find the DN, the present invention provides a way for users to specify a value for a default attribute.

Dialog window 500 is a dialog that allows a user to specify host computer name 502 in addition to standard dialog buttons 504–506 for "OK" and "CANCEL". An anonymous search has been performed against a directory supported by the user-specified host computer, and all of the DNs which are present in a directory supported by the user-specified host computer have been located and displayed in DN list 508. If a single DN is found, the automated DN lookup utility provides the DN to the remainder of the configuration process. If multiple DNs are found, then once the user has selected a DN, the automated DN lookup utility provides the selected DN to the remainder of the configuration process. While a DN may be found and selected for use within a configuration process, the process may be used for other LDAP-related processes. The user may select "Configure" button 510 to choose default attributes for the anonymous searches that are performed to locate DNs, as explained in more detail further below.

Figure 6:
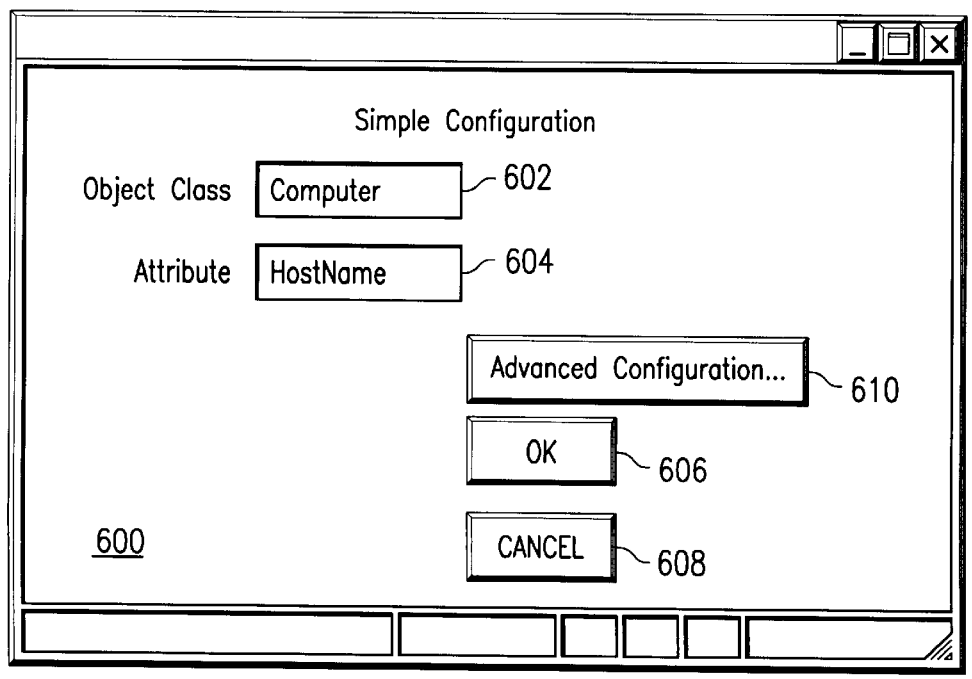
FIG. 6 is a diagram showing a dialog for user-specified changes of the default configuration of attributes and filters.

With reference now to FIG. 6, a diagram shows a dialog for user-specified changes of the default configuration of attributes and filters in accordance with a preferred embodiment of the present invention. To perform operations against a directory entry, users usually need to specify the DN of the entry. To help a user find the DN, the present invention provides a way for users to specify a value for a default attribute. In this manner, a user may configure the default attributes for the anonymous search for DNs. If necessary, a user may also configure the attributes and filter for the anonymous search.

Dialog window 600 is a dialog that allows a user to input object class name 602 and attribute name 604 in addition to standard dialog buttons 606–608 for "OK" and "CANCEL". The value of object class name 602 determines the objects in the directory in which the specified attributes may be found, i.e. the objects against which a directory search is to be performed. In other words, when the directory search is performed, the directory server will only consider objects belonging to the object class. Attribute name 604 determines the directory entry attribute that a user may specify in another dialog window. In the example, the user has specified "Computer Name" as an attribute in dialog 600, which matches the name of the input field in dialog 500 in which a user may specify an attribute value. The user may select "Advanced Configuration" button 610 to input other configuration data items to be used with the anonymous searches.

With reference now to FIG. 7, a diagram shows a dialog for user input of additional attributes and filters in accordance with a preferred embodiment of the present invention. In a manner similar to FIG. 6, dialog window 700 is a dialog that allows a user to input object class name 702 and attribute name 704 in addition to standard dialog buttons 706–708 for "OK" and "CANCEL". The user may specify a filter for all of the specified attributes using input field 710. For example, the value of the input attribute "HostName" has been marked with a wild card character ("?")

In the example in FIG. 7, the filter value has been "pre-filled" so that the search filter string contains terms which match other search values specified elsewhere within the configuration information. However, a user may specify different values, alternative values, or additional values within the input field for the filter. When the directory search is conducted, the search terms within the filter may be implicitly, logically ANDed with other input fields for input attributes. For example, if the directory also contained objects of class type "Router", then the user could configure an object class input field with a default value of "Computer" but create another filter term of "ObjectClass= Router", and both object classes may be used in the directory search. The difference between specifying the object classes in different manners appears in the other input dialog windows in which the first object class is presented while the terms within the filter are only presented within an "Advanced Configuration" dialog window. In other words, certain inputs may seldom be used by a user, and the various inputs may be presented to the user in accordance with the frequency of use, importance of use, etc.

With reference now to FIG. 8, a flowchart depicts a process for allowing a user to configure a DN lookup utility to facilitate anonymous searches for DNs in accordance with a preferred embodiment of the present invention. FIG. 8 describes some of the steps that may be implemented in order to provide a user with some of the functionality shown in FIG. 6 and FIG. 7.

The process begins by displaying a configuration dialog window for a DN lookup utility so that a user may enter configuration information (step 802). The user enters input attributes and LDAP search filter expressions into a configuration dialog (step 804), after which the configuration dialog is closed (step 806).

An input dialog window is displayed by the DN lookup utility for an LDAP-related process, such as for a directory logon, so that the user may enter required information (step 808). The user then enters attribute values into the input dialog (step 810). The input dialog may contain input fields that have been previously configured by the user by specifying default input attributes, default attribute values, etc., as shown in FIG. 6 and FIG. 7. After the user has input the information requested through the dialog window by the LDAP-related process, an anonymous search is requested against a directory server using the user-specified LDAP search filter, user-specified attribute values, and/or other user input values in order to lookup DNs that fully or partially match the user input values (step 812). The DN lookup utility then receives DNs that fully or partially match the user input values (step 814), and the DN lookup utility then passes one or more DNs to one or more other LDAP-related processes (step 816). The process for allowing the user to configure the DN lookup and enter values for the DN lookup is then complete.

It should be noted that the LDAP-related process described with respect to FIGS. 4A–4D was a directory logon process that may precede an LDAP bind operation, whereas the LDAP-related process described with respect to FIG. 8 is a generic LDAP operation. In the example in FIGS. 4A–4D, a user inputs a user name or user identifier in a manner similar to a generic logon procedure, but the user input is then incorporated into the LDAP search filter. In the example in FIG. 8, a user enters input values that are appropriate for the function being performed in association with the LDAP operation.

If the user was already authenticated to the directory server, then the user may need to modify information within the directory. If the directory entries to be modified are related to a particular schema of objects, then the user might enter a partial identifier for the information that the user desires to modify. After which the user receives the distinguished name or names for the directory entry or entries to be modified, the user may use one or more of the distinguished names in appropriate LDAP-related processes. Hence, in general, the user input may be matched, at least partially, against relative distinguished names for the entries in the directory.

The advantages of the present invention are apparent in view of the detailed description of the invention provided above. In the present state of computing, a user must remember many personal identifiers, personal identification numbers, passwords, etc. LDAP-related processes use distinguished names, which can be long and syntactically complex, and a user may become burdened by attempting to remember DNs in addition to other personal information. In other circumstances, the user may never have known the distinguished name of an object which the user desires to access or modify, i.e. the user knows that the directory may or must contain an instance of the object but does not know the distinguished name for the object.

By using the DN lookup methodology or utility of the present invention, the cognitive load for a user is reduced. Rather than typing in a full DN, a user may input a given name or just a few characters of a given name, and the DN lookup utility automatically determines the full, appropriate DN. The automated DN lookup may be applied in any computing situation in which a user is required to specify a DN, and a user may also configure attributes and filters to search for DN candidates. For example, the user may configure an object class against which the LDAP search is to be performed.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the present invention is illustrated using LDAP directory servers, the processes of the present invention may be applied to other types of servers. The embodiment was chosen and described in order to best explain the principles of the invention the practical application and to enable others of ordinary skill in the art to understand the invention for various embodiments with various modifications as are suited to the particular use contemplated.

What is claimed is:

1. A method for selecting a distinguished name for use in a Lightweight Directory Access Protocol (LDAP) directory operation in a data processing system, the method comprising the computer-implemented steps of:

receiving user input for an identifier string via a first input means, wherein the identifier string is not a distinguished name;

generating an LDAP search filter string comprising at least a portion of the identifier string;

requesting a directory search using the LDAP search filter string;

in response to the requested directory search, receiving one or more distinguished names; and in response to receiving one or more distinguished names for the requested directory search, applying a received distinguished name in the LDAP directory operation.

2. The method of claim 1 wherein the directory search is an anonymous search.

3. The method of claim 1 further comprising:
receiving user input for an object class identifier; and
inserting a search term for an object class identified by the object class identifier in the LDAP search filter string.

4. The method of claim 1 further comprising:
in response to receiving a single distinguished name for the requested directory search, automatically applying the received distinguished name in the LDAP directory operation.

5. The method of claim 1 further comprising:
in response to receiving a plurality of distinguished names for the requested directory search, presenting the plurality of distinguished names to the user;
receiving user input to select one of the plurality of distinguished names; and
applying the selected distinguished name in the LDAP directory operation.

6. The method of claim 5 wherein a portion of the identifier string matches a relative distinguished name within the selected distinguished name.

7. The method of claim 1 wherein a portion of the identifier string matches a relative distinguished name within a received distinguished name.

8. The method of claim 1 wherein the identifier string comprises a partial identifier and a wildcard indicator.

9. The method of claim 1 wherein the identifier string is at least a portion of a user name or user identifier.

10. The method of claim 9 further comprising:
performing an authentication process for the user using a distinguished name received in response to the requested directory search.

11. The method of claim 1 further comprising:
receiving a user-specified name for an LDAP objectClass to be used in the directory search.

12. The method of claim 1 further comprising:
receiving a user-specified name for an LDAP entry attribute to be used in the directory search.

13. The method of claim 1 further comprising:
receiving a user-specified LDAP search filter string to be used in the directory search, wherein the user-specified LDAP search filter string is combined with the generated LDAP search filter string.

14. The method of claim 1 further comprising:
providing user-specified configurability for the first input means via a second input means.

15. The method of claim 14 further comprising:
receiving a user-specified identifier via the second input means; and
generating an input field in the first input means based on the user-specified identifier.

16. The method of claim 15 wherein the user-specified identifier is an LDAP entry attribute.

17. A data processing system for selecting a distinguished name for use in a Lightweight Directory Access Protocol (LDAP) directory operation in the data processing system, the data processing system comprising:
first receiving means for receiving user input for an identifier string via a first input means, wherein the identifier string is not a distinguished name;
generating means for generating an LDAP search filter string comprising at least a portion of the identifier string;
requesting means for requesting a directory search using the LDAP search filter string;
second receiving means for receiving, in response to the requested directory search, one or more distinguished names; and
first applying means for applying, in response to receiving one or more distinguished names for the requested directory search, a received distinguished name in the LDAP directory operation.

18. The data processing system of claim 17 further comprising:
second applying means for automatically applying, in response to receiving a single distinguished name for the requested directory search, the received distinguished name in the LDAP directory operation.

19. The data processing system of claim 17 further comprising:
presenting means for presenting, in response to receiving a plurality of distinguished names for the requested directory search, the plurality of distinguished names to the user;
third receiving means for receiving user input to select one of the plurality of distinguished names; and
second applying means for applying the selected distinguished name in the LDAP directory operation.

20. The data processing system of claim 19 wherein a portion of the identifier string matches a relative distinguished name within the selected distinguished name.

21. The data processing system of claim 17 wherein a portion of the identifier string matches a relative distinguished name within the received distinguished name.

22. The data processing system of claim 17 wherein the identifier string comprises a partial identifier and a wildcard indicator.

23. The data processing system of claim 17 wherein the identifier string is at least a portion of a user name or user identifier.

24. The data processing system of claim 23 further comprising:
performing means for performing an authentication process for the user using a distinguished name received in response to the requested directory search.

25. The data processing system of claim 17 further comprising:
fourth receiving means for receiving a user-specified name for an LDAP objectClass to be used in the directory search.

26. The data processing system of claim 17 further comprising:
fifth receiving means for receiving a user-specified name for an LDAP entry attribute to be used in the directory search.

27. The data processing system of claim 17 further comprising:
sixth receiving means for receiving a user-specified LDAP search filter string to be used in the directory search, wherein the user-specified LDAP search filter string is combined with the generated LDAP search filter string.

28. The data processing system of claim 17 further comprising:
providing means for providing user-specified configurability for the first input means via a second input means.

29. The data processing system of claim 28 further comprising:

seventh receiving means for receiving a user-specified identifier via the second input means; and generating means for generating an input field in the first input means based on the user-specified identifier.

30. The data processing system of claim 29 wherein the user-specified identifier is an LDAP entry attribute.

31. A computer program product in a computer-readable medium for use in a data processing system for selecting a distinguished name for use in a Lightweight Directory Access Protocol (LDAP) directory operation, the computer program product comprising:

first instructions for receiving user input for an identifier string via a first input means, wherein the identifier string is not a distinguished name;

second instructions for generating an LDAP search filter string comprising at least a portion of the identifier string;

third instructions for requesting a directory search using the LDAP search filter string;

fourth instructions for receiving, in response to the requested directory search, one or more distinguished names; and fifth instructions for applying, in response to receiving one or more distinguished names for the requested directory search, a received distinguished name in the LDAP directory operation.

32. The computer program product of claim 31 further comprising:

instructions for automatically applying, in response to receiving a single distinguished name for the requested directory search, the received distinguished name in the LDAP directory operation.

33. The computer program product of claim 31 further comprising:

instructions for presenting, in response to receiving a plurality of distinguished names for the requested directory search, the plurality of distinguished names to the user;

instructions for receiving user input to select one of the plurality of distinguished names; and instructions for applying the selected distinguished name in the LDAP directory operation.

34. The computer program product of claim 31 wherein a portion of the identifier string matches a relative distinguished name within the received distinguished name.

35. The computer program product of claim 33 wherein a portion of the identifier string matches a relative distinguished name within the selected distinguished name.

36. The computer program product of claim 31 wherein the identifier string comprises a partial identifier and a wildcard indicator.

37. The computer program product of claim 31 wherein the identifier string is at least a portion of a user name or user identifier.

38. The computer program product of claim 37 further comprising:

instructions for performing an authentication process for the user using a distinguished name received in response to the requested directory search.

39. The computer program product of claim 31 further comprising:

instructions for receiving a user-specified name for an LDAP objectClass to be used in the directory search.

40. The computer program product of claim 31 further comprising:

instructions for receiving a user-specified name for an LDAP entry attribute to be used in the directory search.

41. The computer program product of claim 40 further comprising:

instructions for receiving a user-specified identifier via the second input means; and generating an input field in the first input means based on the user-specified identifier.

42. The computer program product of claim 41 wherein the user-specified identifier is an LDAP entry attribute.

43. The computer program product of claim 31 further comprising:

instructions for receiving a user-specified LDAP search filter string to be used in the directory search, wherein the user-specified LDAP search filter string is combined with the generated LDAP search filter string.

44. The computer program product of claim 31 further comprising:

instructions for providing user-specified configurability for the first input means via a second input means.

* * * * *